Aug. 28, 1962
W. C. WEST
3,051,055
COMBINATION OVERHEAD SIGNAL VIEWER AND
SIDE CLEARANCE INDICATOR
Filed Dec. 8, 1959
FIG. 1.
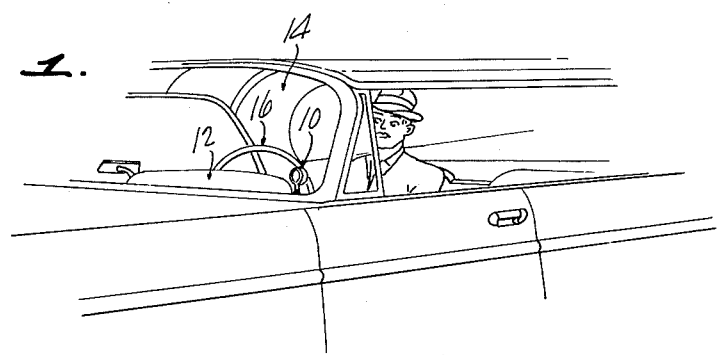
FIG. 2.
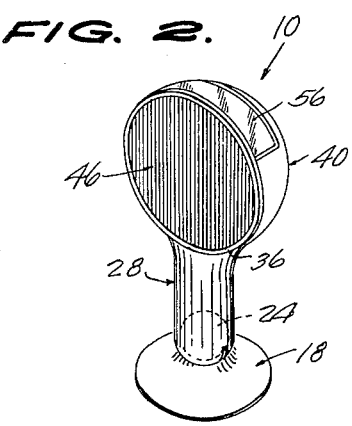
FIG. 3.
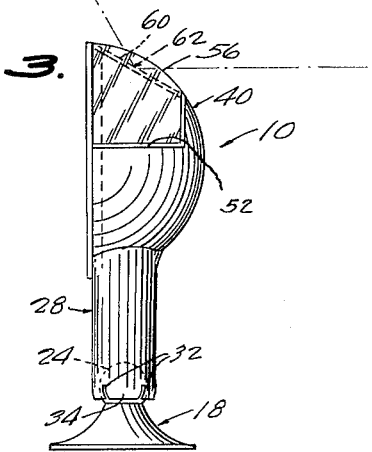
FIG. 5.
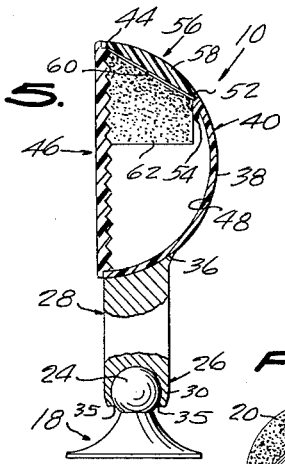
FIG. 4.
FIG. 6.
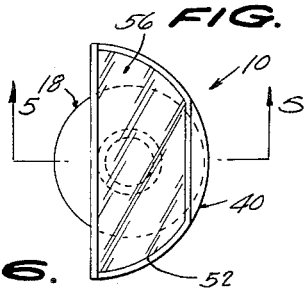
INVENTOR.
WILLIAM C. WEST,
BY
McMorrow, Berman & Davidson
ATTORNEYS

United States Patent Office 3,051,055
Patented Aug. 28, 1962

3,051,055
COMBINATION OVERHEAD SIGNAL VIEWER
AND SIDE CLEARANCE INDICATOR
William C. West, 9425 New Hammond Highway,
Baton Rouge, La.
Filed Dec. 8, 1959, Ser. No. 858,188
2 Claims. (Cl. 88—81)

This invention relates to a combination overhead traffic signal viewer and side clearance indicator for automobiles.

The primary object of the invention is to provide a combination device of the kind indicated which, in daylight serves as overhead traffic signal reflector for the driver of an automobile, and which after dark serves as such reflector and additionally as a side clearance indicator to an on-coming vehicle, which is illumined by and reflects the headlights of the on-coming vehicle, in a manner to show the drivers of the approaching vehicles the amount of side clearance therebetween, despite that a headlight on either side of the approaching vehicle may be out of operation.

Another object of the invention is the provision of highly efficient and practical combination device of the character indicated above which is of small, compact, and low silhouette form, and which is devised to be easily mounted on the top of an automobile instrument panel, at the extreme left of the windshield and to the left of the steering wheel, and which is short enough and small enough to avoid any interference with or abridgement of the driver's normal vision through the windshield, preferably by means of a contact adhesive equipped base.

A further object of the invention is the provision of a rugged and serviceable combination device of the character indicated above which is uncomplex in construction, and which can be produced in attractive and decorative forms at relatively low cost, for mass distribution in garages and auto accessory stores.

Other important objects and advantageous features of the invention will be apparent from the following description and the accompanying drawings, wherein, for purposes of illustration only, a specific form of the invention is set forth in detail.

In the drawings:

FIGURE 1 is a fragmentary perspective view, showing a device of the invention installed on an automobile instrument panel;

FIGURE 2 is an enlarged front perspective view of said device;

FIGURE 3 is a side elevation thereof;

FIGURE 4 is a top plan view thereof;

FIGURE 5 is a vertical section taken on the line 5—5 of FIGURE 4; and

FIGURE 6 is a bottom plan view of the base of the device showing partial removal therefrom of a protective sheet for exposing contact adhesive for securing the base on an instrument panel.

Referring in detail to the drawings, wherein like numerals designate like parts throughout the several views, the illustrated device, generally designated 10, is shown mounted fixedly on the top, at the extreme left, of an automobile instrument panel 12 and projecting thereabove, behind the associated windshield 14, and to the left of the steering wheel 16.

The device 10 comprises a downwardly flared, preferably circular base 18 having a flat bottom surface to which is applied a coating 20 of adhesive, such as contact cement, which is protected prior to installation of the device, by a removable sheet 22. It will be understood that the base 18 can be mounted or installed in any other suitable manner, and that the use of adhesive provides unusually convenient, easy to use, and inexpensive mounting means, requiring no tools or special skill.

Fixed centrally on the smaller upper end of the base 18 is a swivel ball 24, over which is rotatably and securably engaged a ball socket 26 formed on the lower end of a vertically elongated pedestal 28. The wall 30 of the socket 26 has circumferentially spaced slots 32 opening to its lower end which define tongues 34 therebetween, whose lower ends are directed inwardly beneath the ball 24, as indicated at 35, so as to hold the ball in the socket, so that the angle of the housing 40 can be suitably adjusted as may be required. It will be understood that a different construction of ball and socket arrangement is within the present invention, as is a solid or fixed connection between the base 18 and the pedestal 28.

The pedestal 28 is preferably cylindrical in form and flared, as indicated at 36, at its upper end, into the bottom of the side wall 38 of a horizontal axis hollow hemispherical housing 40, into whose open forward side is suitably secured, as indicated at 44, a reflector glass 46. The glass 46 is of a distinctive color, such as red or some other color where red is objectionable, so as to avoid confusion with other normal reflections of on-coming headlights and have definite significance. The inner surface 48 of the side wall 38 of the housing 40 can be reflective where the glass 46 is relatively translucent, so as to enhance the reflective power of the glass.

The upper side or top of the housing 40 is formed with a relatively large circumferentially extending and preferably rectangular top opening 52, which, as shown in FIGURES 3, 4 and 5, substantially spans the top of the housing and reaches rearwardly from the open front of the housing to a point below the upper extremity of the housing and close to the rear of the housing. The top opening 52 is surrounded by an internal lip 54 into which is securably inset a conformably shaped clear arcuate sphero-conical convex lens 56, having a spherical outer surface 58, generally conforming to the hemispherical curvature of the hollow housing, and having a conical inner surface 60. The conical underside 60 of the lens 56 has engaged therewith or formed thereon a reflective backing 62. This arrangement of the lens 56 positions the lens at a rearwardly and downwardly canted angle relative to the open side of the housing, with the reflective backing 62 at a similar angle, so that an overhead signal, located forwardly of the windshield 14, can be seen in the lens 56 by a driver seated behind the steering wheel 16, while looking straight ahead through the windshield. Further, the transverse curvature of the lens 56 enables the driver to similarly see traffic signals which are located at the left and to the right instead of straight ahead in the line of travel of the automobile, both in daylight and after dark.

The foregoing benefits are obtained, after dark, along with distinctively colored reflection to on-coming drivers of light from their headlights by the reflector glass 46. The device 10 and the reflector glass 46, being located at the extreme left of the instrument panel of the approaching vehicle, and hence close to the left-hand side or boundary of such vehicle, on-coming drivers are afforded a clear and definite indication of the amount of side clearance, obtaining at the time, so that the drivers can take measures to avoid a collision.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A combination overhead light signal viewer and side clearance indicator, comprising a substantially hemispherical hollow housing, a mounting base upon which said housing is supported with its axis in a substantially horizontal position, said housing having a forwardly facing open side and having an opening in its top portion, a reflective glass secured in said open side, and an arcuate sphero-conical convex lens secured in the housing and closing said top opening, said lens having a spherical outer surface generally conforming to the hemispherical curvature of the hollow housing and having a conical inner surface arranged in angled relationship to said open side, and having a reflective coating on its inner surface.

2. A combined overhead light signal viewer and side clearance indicator according to claim 1, wherein said base has an upstanding ball, said housing having a vertically elongated pedestal extending downwardly from its bottom, said pedestal having a ball socket in its lower end securably and rotatably receiving said ball.

References Cited in the file of this patent

UNITED STATES PATENTS

| 2,200,168 | Goldberg | May 7, 1940 |
| 2,704,962 | De Beaubien | Mar. 29, 1955 |
| 2,735,341 | Borsody | Feb. 21, 1956 |

FOREIGN PATENTS

| 751,262 | France | June 12, 1933 |